United States Patent Office 3,392,972
Patented July 16, 1968

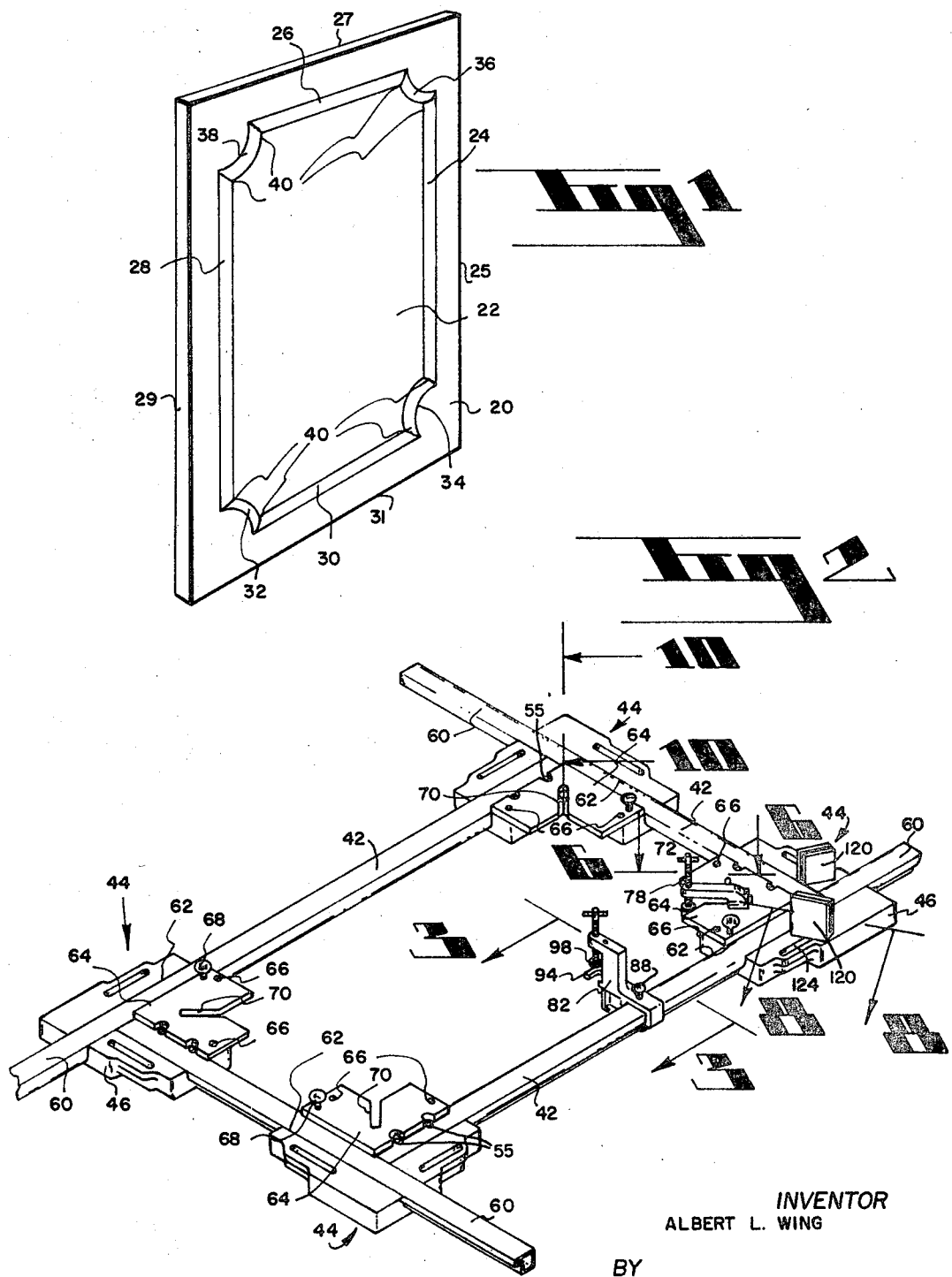

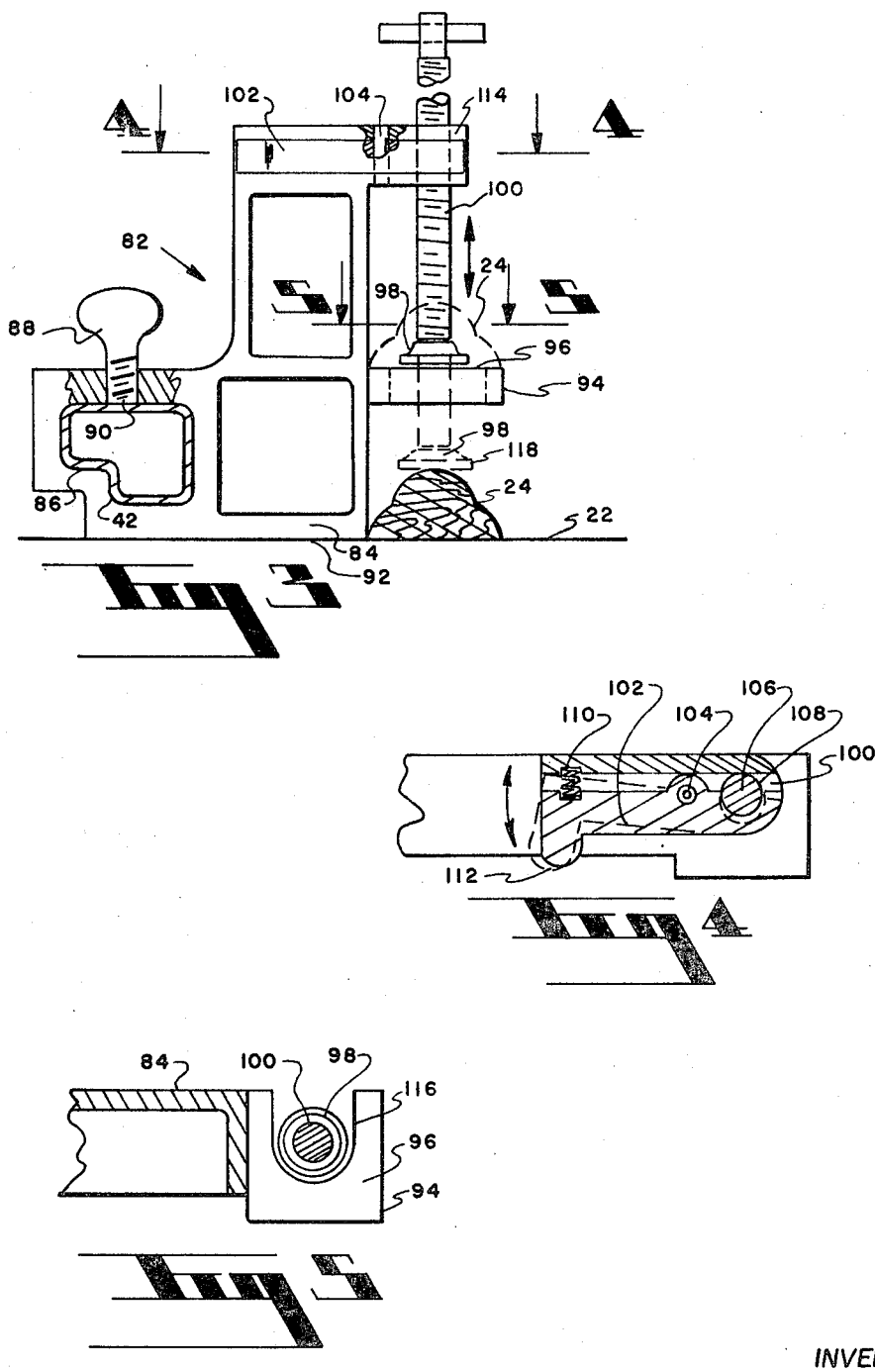

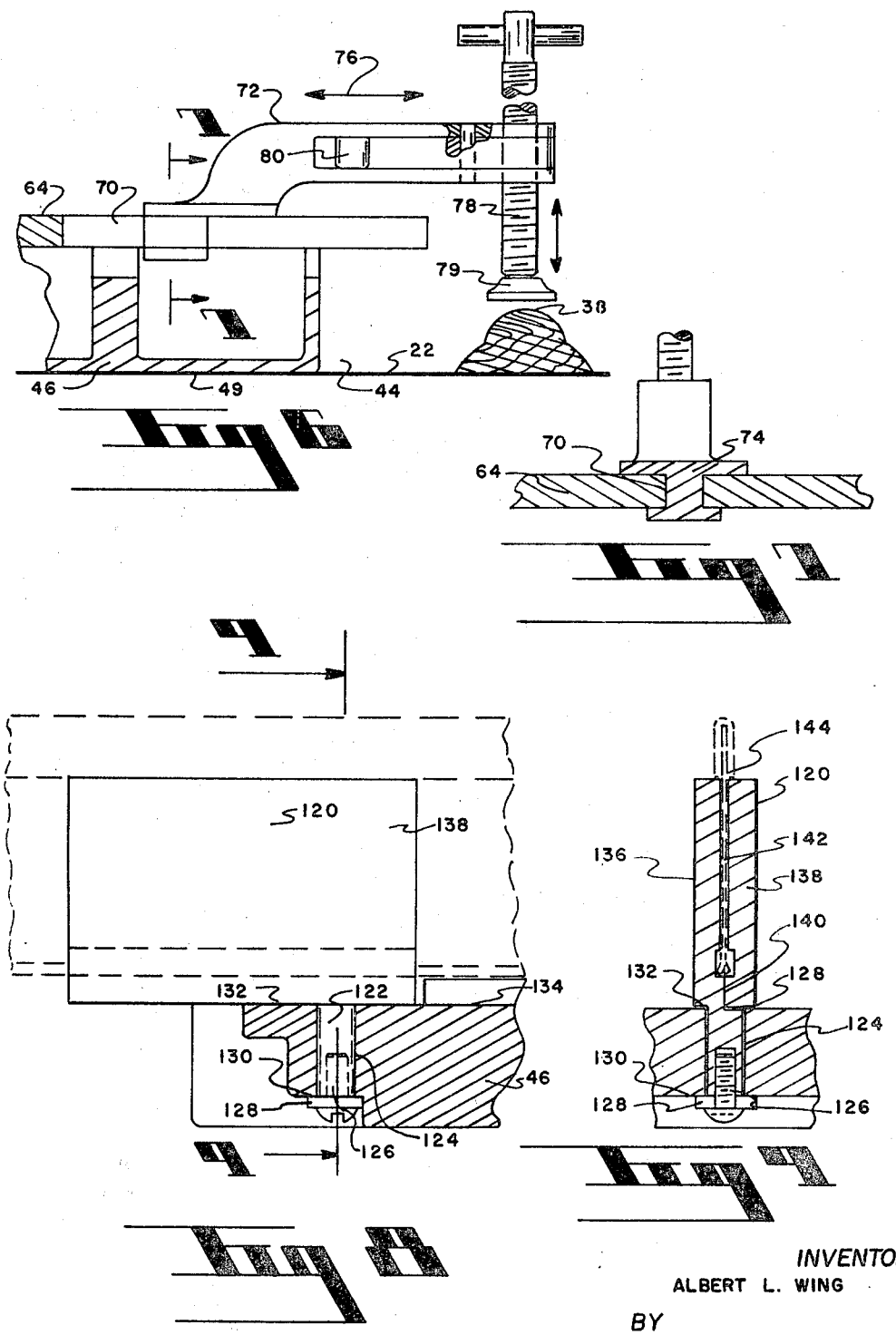

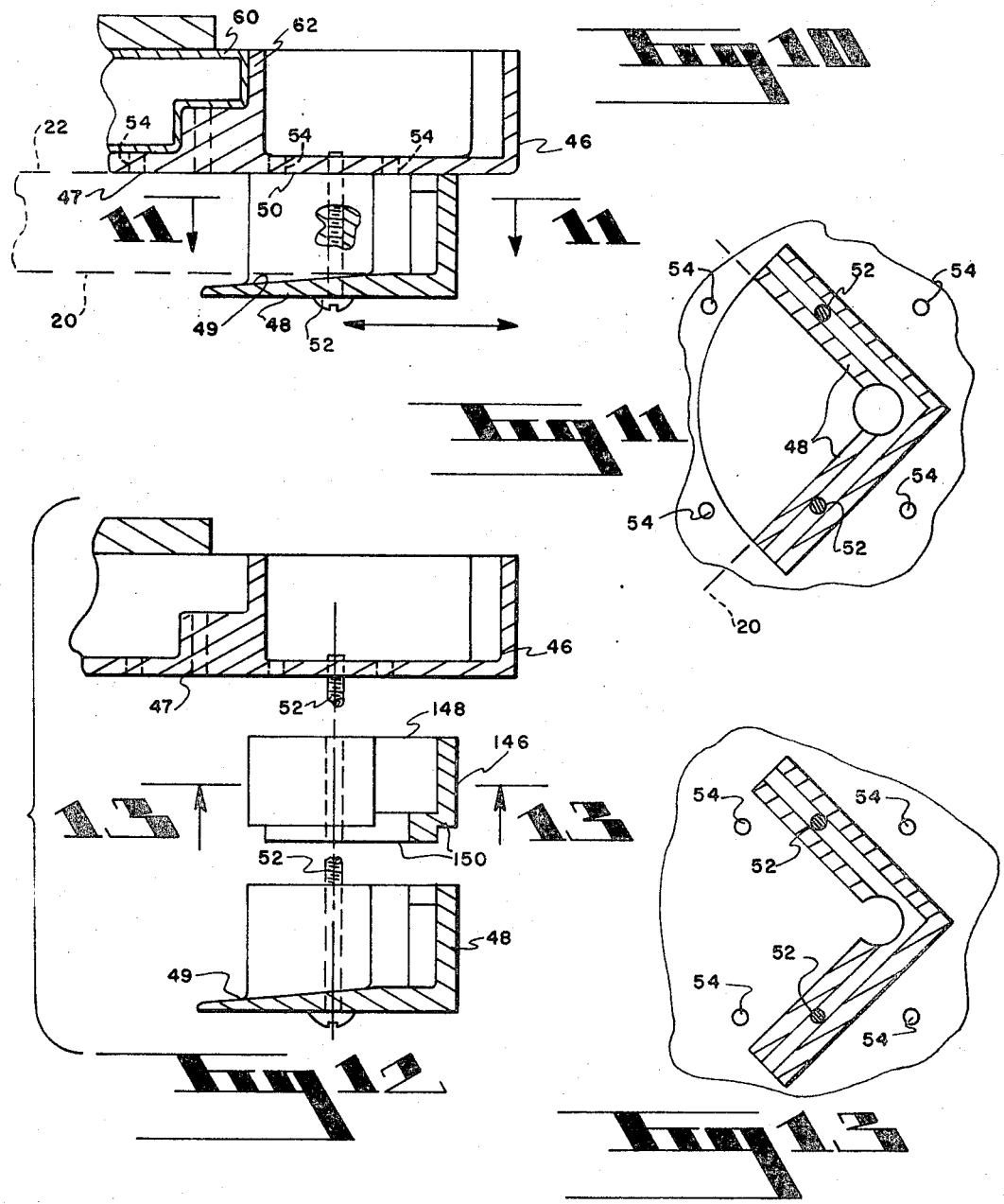

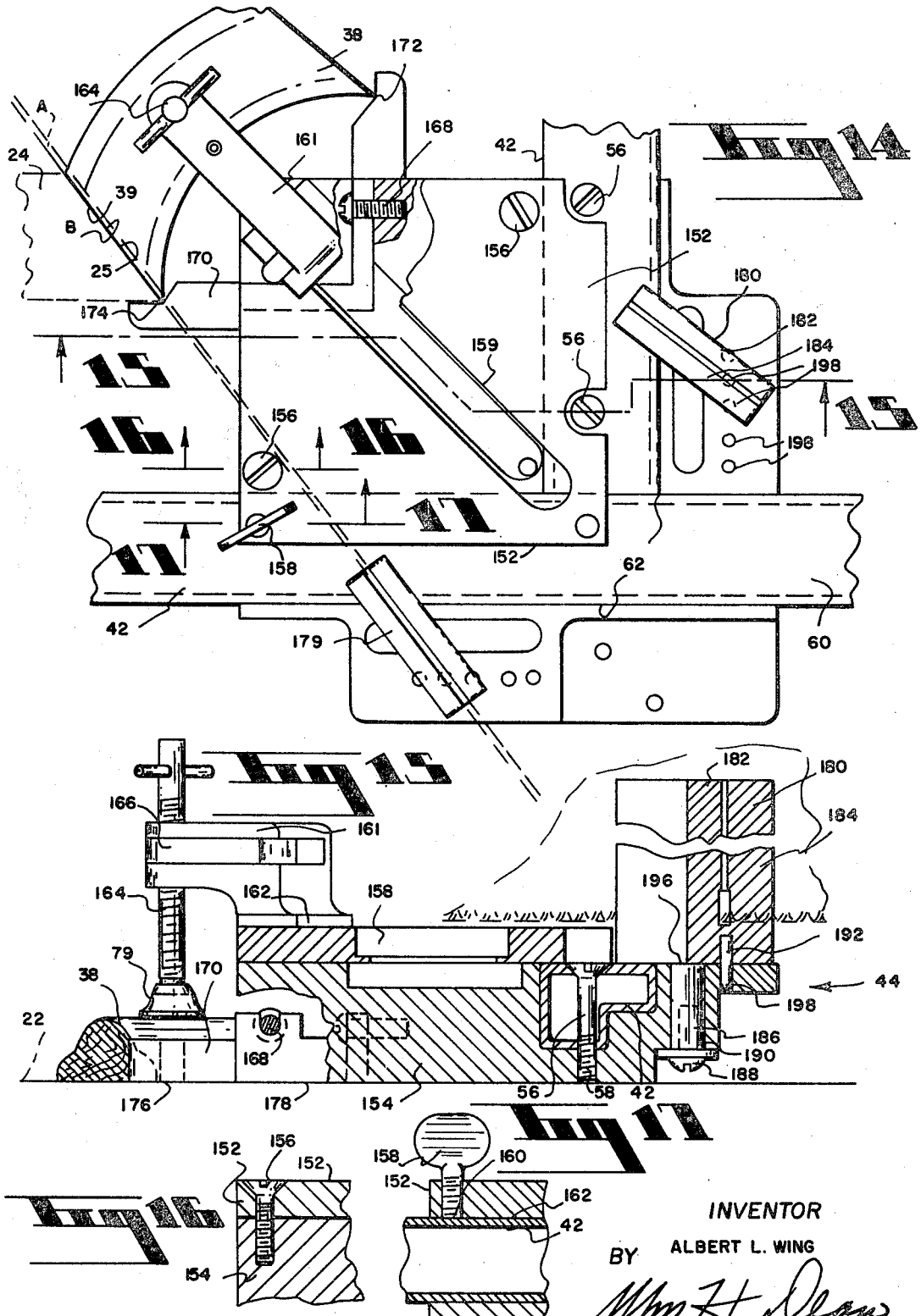

3,392,972
MOLDING CUTTING AND FITTING JIG
Albert L. Wing, 1220 McKemy St.,
Tempe, Ariz. 85281
Filed Apr. 19, 1965, Ser. No. 448,918
10 Claims. (Cl. 269—87.2)

ABSTRACT OF THE DISCLOSURE

A molding cutting and fitting jig comprising a rectangularly adjustable frame including molding segment holding clamps in the corners of the frame, and saw guide means at said corners provided with angularly adjustable means for aligning a saw with molding held in the corners of the jig precisely to cut and miter the molding, and fitting the molding into position in the jig.

---

This invention relates to a molding cutting and fitting jig, and more particularly to a molding cutting and fitting jig which is particularly adapted for use in precisely cutting and fitting molding to the fascial surfaces of cabinet drawers and doors or other surfaces, as desired.

Ornamental molding has been applied to the fascia of kitchen cabinet doors and drawers, such molding generally is made of wood and when fitted to such surfaces, provides an ornamental projecting design.

Heretofore, the cutting and fitting of such molding for installation on the fascia of cabinet doors and drawers have been difficult and time consuming. The joints of the molding must be precisely mitered and fitted and the mitered pieces of the molding must be secured on the surface of the door, such that the mitered joints are neatly and closely fitted. Various facilities, including templets and layout instructions, have been used to enable a cabinetmaker or carpenter to cut and secure molding onto the fascia of various doors and drawers. Due to the necessity of precise fitting of the mitered joints of the molding, the cost thereof, when manually fitted to the fascia of a cabinet door or drawer, becomes economically prohibitive, particularly with respect to moderately priced homes.

Accordingly, it is an object of the present invention to provide a molding cutting and fitting jig which greatly facilitates the installation of ornamental molding on the fascia of kitchen cabinet doors and drawers.

Another object of the invention is to provide a molding cutting and fitting jig which greatly reduces the cost of labor in the installation of ornamental molding on the fascia of kitchen and cabinet doors and drawers.

Another object of the invention is to provide a molding cutting and fitting jig which very accurately miters ends of molding, while at the same time, cutting them precisely to length in correspondence with complemental pieces of molding to thereby reduce the waste normally attendant to the manual cutting and fitting of ornamental molding.

Another object of the invenion is to provide a novel molding cutting and fitting jig which is particularly adapted for use in cutting and fitting longitudinal pieces of molding in parallel spaced relation with edges of doors in relation to precut arcuate sections of such molding; said cutting and fitting jig being usable concurrently to cut and fit the molding and to serve as a jig for securing the molding in proper assembly with the surface of a door or the like.

Another object of the invention is to provide a novel clamping and cutting means for use in cutting and fitting ornamental molding to the surface of doors; said cutting and clamping means including novel clamps having a plurality of levels, one of which is used for holding the molding while cutting it precisely to fit complemental pieces of molding and the other clamping level being used to hold the molding on the face of the door while securing it thereto in precise assembly with the complemental pieces of molding.

Another object of the invention is to provide a molding cutting and fitting jig which is quite versatile with relation to the miter cutting and fitting of pieces of molding in complemental relation to a plurality of different sized arcuate precut molding sections which are produced commercially.

Another object of the invention is to provide a molding cutting and fitting jig which greatly reduces the labor time and improves the accuracy attendant to the cutting and fitting of ornamental molding on the fascia of cabinet doors or drawers to thereby render such operations considerably more economical and to thereby improve the marketing of such ornamental molding and to provide the general public with such improvements at a relatively economic advantage.

Further objects and advantages of the present invention may be apparent from the following specification, appended claims, and accompanying drawings, in which:

FIG. 1 is a perspective view of a cabinet door showing ornamental molding fitted and secured on the fascial surface thereof;

FIG. 2 is a perspective view of a molding cutting and fitting jig, in accordance with the present invention, which is adapted for use in holding the door, shown in FIG. 1, and for cutting, getting and securing ornamental molding to the door, as shown in FIG. 1 of the drawings;

FIG. 3 is an enlarged sectional view taken from the line 3—3 of FIG. 2, showing various positions of the clamping structure of the invention by broken and solid lines;

FIG. 4 is a fragmentary plan sectional view taken from the line 4—4 of FIG. 3;

FIG. 5 is a fragmentary plan sectional view taken from the line 5—5 of FIG. 4;

FIG. 6 is an enlarged fragmentary sectional view taken from the line 6—6 of FIG. 2 and showing the view rotated substantially 180 degrees from that as shown in FIG. 2;

FIG. 7 is a fragmentary sectional view taken from the line 7—7 of FIG. 6;

FIG. 8 is an enlarged fragmentary sectional view taken from the line 8—8 of FIG. 2 and showing the structure rotated substantially 180 degrees from that shown in FIG. 2;

FIG. 9 is a fragmentary sectional view taken from the line 9—9 of FIG. 8;

FIG. 10 is an enlarged fragmentary sectional view taken from the line 10—10 of FIG. 2;

FIG. 11 is a sectional view taken from the line 11—11 of FIG. 10;

FIG. 12 is an exploded view of a modified structure of the invention taken on substantially the same plane as FIG. 10;

FIG. 13 is a fragmentary sectional view taken from the line 13—13 of FIG. 12;

FIG. 14 is a fragmentary plan sectional view of a modified structure at one corner of the molding cutting and fitting jig of the present invention;

FIG. 15 is a sectional view taken from the line 15—15 of FIG. 14;

FIG. 16 is a fragmentary sectional view taken from the line 16—16 of FIG. 14; and FIG. 17 is a fragmentary sectional view taken from the line 17—17 of FIG. 14.

As shown in FIG. 1 of the drawings, a conventional panel 20 may be that of a cabinet door or drawer or other rectangular structure on which ornamental molding may be secured. This molding is secured on the fascial surface 22 of the panel 20 and includes four substantially straight sections 24, 26, 28 and 30. These molding sections 24, 26, 28 and 30 are of a cross sectional shape, as indicated in FIGS. 3 and 6, but may be varied according to esthetic requirements. These molding pieces, however, are in a projecting pattern extending from the fascial surface 22. Conventional commercially produced corner portions 32, 34, 36 and 38, are generally arcuate in shape, but may be of some other configuration if desired. These curved or arcuate molding sections are generally made of wood and their opposite ends are precut to quite close dimensional and angular tolerances. Accordingly, the opposite ends of the molding sections 24, 26, 28 and 30, must be precisely mitered to fit opposite ends of the curved sections and the overall length of the straight molding sections must be precisely maintained, in order that all of the mitered joints generally at 40 will fit properly so as to provide a neat esthetic impression. Those who have participated in the cutting and fitting of such ornamental molding on the fascial portions of doors, have found such work to be extremely tedious and time consuming and that oftentimes a substantial amount of molding material is wasted due to the difficulty of properly cutting the straight sections of the molding at opposite ends thereof to fit the mitered joints of the curved sections and also to maintain proper lengths of the straight sections during the precise mitering thereof. Further, the accurate assembling and fitting of all of the molding pieces together in the pattern, as shown in FIG. 1 of the drawings, is quite difficult, and accordingly, the molding cutting and fitting jig of the present invention is designed accurately to cut opposite ends of the straight sections at proper lengths and angles and to serve as a jig for assembling all of the molding sections shown in FIG. 1, and for holding such sections in precise position on a panel, such as the panel 20, during the securement of all of the molding sections in proper precise assembly on the panel.

With reference to FIG. 2 of the drawings, it will be seen that the molding cutting and fitting jig of the invention is a substantially rectangular assembly comprising a plurality of substantially identical bars 42. These bars 42 are preferably hollow tubular steel, the precise cross section of which will be hereinafter described. Connecting all of the bars 42 are corner frame portions 44, there being four of these frame portions 44, which are all substantially identical and as will be hereinafter described. The frame portions 44 are composed of an assembly of parts which hold the bars 42 in juxtaposition and to hold the corner frame portions 44 in engagement with corners of a panel, such as the panel 20 hereinbefore described. Further, these corner frame portions 44 and the assembly of parts thereon, each provides adjustable saw guide mechanism, as well as molding clamping mechanism, for holding the curved molding sections 32, 34, 36 and 38.

Each corner frame portion, as shown in FIG. 10 of the drawings, is provided with a casting or other frame member 46 having an adjustably mounted panel corner engaging fixture 48 secured to a lower surface 50 of the respective corner frame portion, by bolts 52. Each panel corner engaging member 48 is substantially L-shaped, as shown in FIG. 11, and the bolts 52 may be secured in any one of a respective row of holes 54, so that the panel corner engaging member 48 may be moved outward in a diagonal direction with respect to the rectangular assembly of the invention, as shown in FIG. 2 of the drawings, and thereby provide for a variation in the spacing of the straight molding sections 24, 26, 28 and 30, from adjacent respective edge portions 25, 27, 29 and 31, of the panel 20. This is accomplished, as indicated in FIG. 10 of the drawings, wherein the panel 20 is illustrated by broken lines and one corner thereof, is held in the corner engaging member 48 which is also shown in FIG. 11 of the drawings.

One end of each bar 42 is secured by respective screws 55 and 56 to the respective casting 46, shown in FIG. 2, and the casting 154, as shown best in FIGS. 14 and 15 of the drawing. It will be understood that while FIGS. 14 and 15 illustrate the modifications of the invention, the basic structure of the frame casting 46 is similar to the casting 154. The cross-section of the bars 42 is similar and, thus, one end of each bar 42 is secured to a corner frame portion or assembly 44. The screws 56 which, at their lower ends 58, as shown in FIGS. 14 and 15, are screw-threaded in the casting 154.

Opposite end portions 60 of the bars 42 are slidably mounted in channels 62 of the respective corner frame portions 44, all as shown best in FIGS. 2, 10, 14 and 15.

In the structure as shown in FIG. 2 of the drawings, each corner frame portion is provided with a top plate 64 secured to the respective corner frame casting 46 by screws 66. Each plate 64 is provided with a manually operable clamp screw 68 screw-threaded therein and adapted to bear on a normally upper surface of one of the end portions 60 of each respective bar 42, for holding it in juxtaposition longitudinally of the respective channel 62 in which it is adjustably mounted. Thus, all of the bars 42 are longitudinally adjustably mounted in the respective corner frame portions 44, so that the overall rectangular assembly of the molding cutting and fitting jig of the invention may be adjusted to fit larger or smaller rectangular panels, such as the panel 20 shown in FIG. 1. The thumbscrews 68 are similar to the thumbscrews as will be hereinafter described in detail in connection with FIG. 7 of the drawings.

The top plate 64 of each corner frame portion 44 is provided with a diagonally disposed slot 70 adapted to hold a corner molding clamp 72, as shown in FIGS. 6 and 7 of the drawings. The clamp 72 is provided with a T-shaped base 74 slidably adjustable in the respective slot 70 in directions as indicated by double headed arrow 76 longitudinally of the slot 70 in order to dispose the axis of a clamp screw 78 directly over a respective arcuate section of molding 38. The reason for adjusting the clamp longitudinally of the slot 70 being that the molding 38 may be manufactured in different radii and may be of different size, and therefore the clamp 72 is movable longitudinally of the slot 70 and held by the T-shaped portion 74 therein, such that a rotatable pad 79 of the clamp screw 78 may be brought to bear upon the molding 38 to clamp it onto the fascial surface 22 of the panel 20 when it is held in juxtaposition by the panel corner engaging members 48. These members 48, as shown in FIG. 10, are provided with inclined surfaces 49, tending to cam the fascial surface 22 of the panel tightly in engagement with a lower surface 47 of the respective corner frame portion casting 46, all as indicated best in FIG. 10 of the drawings. Thus, the face 22 of each panel is held in a predetermined plane against a respective lower surface 47 of a corner frame portion casting 46. Thus, the clamp 72, together with the panel corner engaging members 48, provide means for holding the panel and the fascia molding in juxtaposition, while securing such molding on a panel 20, as will be hereinafter described in detail.

Each clamp 72 is provided with an externally screw-threaded clamp screw 78 and each slot 70 of each plate 64 may accommodate one of these clamps, as indicated in FIG. 2 of the drawings. The clamp 72, as shown in FIG. 6, is provided with a quick release thread disengaging lever 80 to provide disengagement relative to the threads of the clamp screw 78 to permit quick longitudinal or axial movement of the screw 78 when making approximate adjustments relative to the molding 38, all as will be hereinafter described in connection with the clamp structure shown in FIGS. 3 and 4 of the drawings which contain similar thread disengaging mechanism.

It will be appreciated that FIG. 2 of the drawing illustrates only one of the clamps 72, however, at least four of these clamps are required and provided in the assembly, as shown in FIG. 2 of the drawings, and for purposes of illustration only, three of the clamps 72 are omitted from the respective slots 70 in the respective plates 64.

Slidably mounted on the bars 42 are clamp structures 82, shown best in FIGS. 2, 3, 4 and 5. These clamp structures 82 are longitudinally movable on the bars 42, and while only one is shown in FIG. 2 of the drawings, several of these clamp structures 82 may be mounted on each of the bars 42, as desired. All as will be apparent from the following description in connection with FIGS. 3, 4 and 5 of the drawings.

As shown in FIG. 3 of the drawings, each clamp mechanism 82 is slidably mounted on a respective bar 42. The clamp structure 82 is provided with a frame, preferably a casting 84, having an aperture 86 therein which conforms closely to the cross-section of the respective bar 42 and a thumbscrew 88 is screw-threaded in a portion of the frame 84 above the respective bar 42 and a lower end 90 of each thumbscrew 88 may be screw-threadably brought to bear frictionally upon the bar 42 for holding the clamp frame 84 in juxtaposition longitudinally of the respective bar 42.

The clamp frame 84 is provided with a lower surface 92 which coincides with a predetermined plane at the lower surface 47 of each corner frame portion casting 46. Additionally, each clamp frame 84 is provided with a projecting ledge structure 94. This ledge structure is provided with an upper surface 96 adapted to support a molding section, such as one of the sections 24, 26, 28 or 30, shown in FIG. 1 of the drawings. When the molding sections 24, 26, 28 and 30 are supported on surfaces 96 of the ledges 94, they are held in parallel relation with the bars 42 and spaced inwardly of the outer edges of the panel 20 and in the broken line position of such molding 24, as shown in FIG. 3, a rotating pad 98 of a clamp screw 100 may be brought to bear on the molding 24 to hold it securely on the surface 96 of the ledge structure 94, and in this position, the molding may be cut and mitered precisely, as will be hereinafter described.

To facilitate longitudinal adjustment of the externally screw-threaded screw 100, a quick release lever nut 102 is pivotally mounted on a pin 104 and, as shown in FIG. 4 of the drawings, each nut is provided with a helically screw-threaded half nut section 106, pivotal about the axis of the pin 104 and normally held in engagement with a peripherally threaded portion 108 of the screw 100 by means of a compression spring 110 tending to urge the lever 102 in a direction to cause firm engagement of the threads 106 of the nut with the peripheral threads of the screw 100.

A projecting thumb engaging portion 112 is provided on the lever 102 for manual actuation and to be engaged by a person's fingers for disengaging the threads of the lever 102, so that the screw 100 may be quickly moved longitudinally of its axis with respect to the clamp frame and particularly a cantilevered portion 114 thereof, which overhangs the ledge structure 94.

It will be seen from an inspection of FIG. 5 that the ledge structure 94 is provided with an opening 116, through which the rotatable pad 98 on the clamp screw 100 may be moved from a broken line position above the ledge structure 94 to a broken line position 118 slightly above a predetermined plane at which the face 22 of the panel is held, as hereinbefore described.

In this position, the rotatable element 98 on the screw 100 may be brought to bear upon a straight section of the molding 24, which was previously cut in the position indicated by broken lines and on the upper surface 96 of the ledge structure 94, all as will be hereinafter described in detail.

Mounted on each corner frame portion 44 and particularly on each casting section 46 are a pair of saw guides 120, which are substantially identical in construction, the pair being disposed to guide a saw precisely, as will be hereinafter described in connection with the description related to FIG. 14 of the drawings. However, for purposes of illustration in the assembly, reference made to FIG. 2 in which the pair of saw guides 120 are so disposed that they may guide a saw to cut off the straight sections 24, 26, 28 and 30 at each corner of the structure of the invention and to precisely cut the straight sections of molding as held in the broken line position illustrated in FIG. 3. The cutting of the ends of the straight sections may thus be accomplished in order to align and miter the ends of the straight sections with the mitered ends of the curved sections 32, 34, 36 and 38, and particularly, at the junctures 40 hereinbefore pointed out.

As shown in FIGS. 2, 8 and 9 of the drawings, each of the saw guides 120 is provided with downwardly extending stem 122 adjustably movable laterally of its axis and rotatable about its axis in a corresponding slot 124 in the repsective corner frame portion casting 46.

Each stem is provided with a clamp screw 126 screw-threaded therein and provided with a shoulder washer 128 bearing on a ledge 130 to exert a downward force on the saw guide to thereby cause its lower edge 132 to bear solidly on an upper surface portion 134 of each corner frame portion casting 46 and to thereby permit angular alignment adjustment, as well as spacing of the saw guide 120, by moving of the stems thereof longitudinally of the slots 124.

The structure of each saw guide 120 includes a pair of flat plate sections 136 and 138, as shown best in FIG. 9 of the drawings. The stem 122 may be integral with the plate section 136 and the plate 138 may be riveted or otherwise secured to the plate 136 at 140 directly above the clamping edge 132 thereof. Between the plates 136 and 138, is a saw guide slot 142 adapted to guide a molding cutting saw 144 and to maintain alignment of the saw in a manner as will be discussed in more detail in connection with the disclosure of FIG. 14.

Since the saw guides 120 are in pairs and disposed to align with the areas of the junctures 40, the longitudinal portions of the molding, as hereinbefore described are cut preliminarily on the ledges 94 of the clamps 82 and are then lowered to the predetermined plane of the fascial surface 22 of the panel 20, which coincides with the lower surface 47 of each corner frame portion casting 46, as hereinbefore described. It will be apparent that this general procedure and operation may be carried on in connection with thin panels or any panel 20 having varying thickness and overall dimensions and that the spacing of the straight sections of the molding relative to the side edges of the panel may vary or be varied in accordance with the adjustment of the panel corner engaging portions 48 relative to the holes 54 and the screws 52, as shown in FIG. 11 of the drawings, and further, with respect to the varying thickness of the panels to be held in the molding cutting and fitting jig of the invention, references made to FIG. 12 wherein the corner engaging member 48 shown in FIG. 10, may be supported a greater distance from the predetermined plane surface 47 by means of a corner engaging spacer 146, requiring longer bolts 52 which may be engaged in the same holes 54, as hereinbefore described. Thus, the depth of the spacer from its surface 148 to its surface 150 provides for the holding of a panel of additional thickness to coincide with a distance between the inclined surface 49 of the corner engaging member 48 to the surface 47, all as shown in FIG. 12 of the drawings.

Reference is now made to FIGS. 14 to 17, inclusive, and particularly to some of the modifications of the invention shown therein. In accordance with such modifications, a top plate 152 is secured to the corner frame portion casting 154 by screws 156, the detail of which is shown best in FIG. 16 of the drawings. The top plate 152 is similar to the plate 64 and clamp screws 158 at lower ends 160 are similar to the clamp screws 68 and bear on upper surface portions 162 of the respective bars 42 for holding them locked in the respective channel portions 62, as hereinbefore described.

The corner frame portion casting 154 is similar to the hereinbefore described casting 46, except for minor differences, as will be hereinafter described in the mounting of the saw guides and other elements of the invention.

The plate 152 is provided with a slot 159 disposed diagonally with respect to the bars 42 and this slot 159 supports a clamp 161 similar in construction to the clamp 72 shown in FIGS. 6 and 7 of the drawings. This clamp 161 is provided with a T-shaped head structure 162 similar to that structure 74 of the clamp 72 shown in FIG. 7. Thus, the clamp 161 is longitudinally adjustably mounted in relation to the slot 158 to fit positions directly above the curved molding sections 38 in a similar manner to that shown in FIGS. 2 and 6 of the drawings, and as hereinbefore described. The clamp 161 is provided with an adjustable clamp screw 164 with a quick release thread engaging lever 166 similar to the lever 80 and similar to the lever 102 of the clamp 82 shown in FIGS. 3 and 4 of the drawings as previously described.

Mounted on the corner frame portion casting 154, below the plate 152, and by means of screws 168, is an L-shaped molding jig member 170 having a pair of corner ledge portions 172 and 174 adapted to support corresponding edges of a curved molding section 38, as shown in FIGS. 1, 6 and 14 of the drawings. The angle member 170 has a lower surface 176 coinciding with a lower surface 178 of the corner frame casting 154 which also coincides with the fascial surface 22 of the panel 20 and with the plane 47 of the casting 46 previously described in connection with FIG. 10 of the drawings. Thus, the angle shape member 170 is disposed only to hold opposite ends of curved molding sections 38 at a plane on which these sections are to be secured to the fascial surface 22 of a panel. The juxtaposition of the angle member 170 and its ledge portions 172 and 174, precisely holds the curved molding sections of respective corner frame portions, as for example, the molding sections 32, 34, 36 and 38, in precise position for securement of the fascial surface 22 of the panel 20.

It will be seen that a pair of saw guides 179 and 180 are disposed in a similar manner to that of the saw guides 120. These saw guides 179 and 180 are disposed to guide a saw blade, as indicated by broken lines A in FIG. 14 of the drawing, such that one side B of the saw may be aligned with a corresponding end 39 of the molding 38. With such alignment, an end 25 of a molding section 24 for example, may be cut precisely to a mitered disposition and to fit said adjacent end 39 of the molding section 38, and this cutting operation being done as previously described in connection with the disclosure FIG. 3 wherein the molding section 24 is held on the ledge structure 94 at the upper surface 96 thereof, in connection with each clamp 82. It being understood that several of these clamps 82 may be in alignment with each other for holding a section of molding, so that opposite ends thereof may precisely be cut by a saw, as indicated by broken lines A and guided in either the saw guides 120 or the saw guides 179 and 180. It will be seen that when the molding section 24 is cut to a mitered fit, as shown in FIG. 14 of the drawings, it may be dropped down to the solid line position shown in FIG. 3, and secured to the fascial surface 22 of the panel in such a manner that the adjacent ends of the molding section 24 and the curved molding section 38 may fit very precisely. The molding sections may then be either glued and/or tacked to the panel for securing them in assembly on the panel before the bars 42 are released by the screw 68 or 158, for the ultimate movement of the panel corner engaging members 48 apart to release the panel 20.

Attention is now directed to disclosure of the saw guides 179 and 180 shown in FIGS. 14 and 15 of the drawings. Each of these structures are similar and therefore the saw guide 180 will be described in detail. This saw guide 180 is provided with a pair of plates 182 and 184 similar to the plates 136 and 138 previously described in connection with the structure disclosed in FIG. 9.

Integral with one of these plates is a stem 186 having a clamp screw 188 similar to the structure disclosed in FIG. 9 of the drawings.

The stem 186, being slidably mounted in a slot 190, similar to the slot 124 previously disclosed.

Secured to one of the plates 182 or 184 is a dowel pin 192 which projects downwardly below lower end portions 196 of the plates and this dowel pin 192 may be engaged in any one of a plurality of openings 198, which predetermines a spaced disposition of the saw guides 179 and 180 and also their angularity with respect to the slot 158, so that a saw, as indicated by broken lines A may coincide with opposite ends of the molding 38 in its various sizes as commercially manufactured.

It will be appreciated by those skilled in the art that the angle shape member 170 may be readily replaced by removal and replacement of the screws 168 in order to set-up each individual angle member 170 to coincide with the dimensions of the respective curved molding 38. It will be appreciated that various sizes of these moldings may require that the ledges 172 and 174 of the angle member 170 may be apart or closer together and consequently, an angle member 170 must be provided to match each particular size of molding 38 and the various openings 198, hereinbefore described, are such that they receive the dowel pin 192 in approximate correspondence with a respective setting for a respective piece of molding 38. Thus, standard positions of the saw guides 180 may very quickly be established by means of the dowel pins 192 and then very minute angular adjustments may be accomplished in accordance with slight tolerance of each stem 186 in the respective slot 190 of the corner frame portion casting 154.

When it is desired to miter the molding pieces 24, 26, 28 and 30 to fit together at angles of 45 degrees, one of the saw guides 120 or 179 may be secured in one of the slats 70 or 158 and the molding pieces 24, 26, 28, and 30 may be cut at an angle of 45 degrees and fitted together without the curved molding pieces 32, 34, 36 and 38.

It will be obvious to those skilled in the art that various modifications of the present invention may be resorted to in a manner limited only by a just interpretation of the following claims.

I claim:

1. In a molding, cutting and fitting jig the combination of: a frame; first means on said frame for holding a panel in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations.

2. In a molding, cutting and fitting jig the combination of: a frame; first means on said frame for holding a panel in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations; said first means having a reference plane structure for holding a surface of a panel at a predetermined plane relative to said clamp means; ledge structures supported on said frame in spaced relation with said predetermined plane for holding said molding while clamped by said clamp means and during use of a saw in said saw guide means for cutting said molding; said clamp means extendable and disposed to clamp pieces of said molding on said panel at said predetermined plane after being cut by said saw and during the fixing of said molding on said panel.

3. In a molding, cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said first means having a reference plane structure for holding a surface of a panel at a predetermined plane relative to said clamp means; ledge structures supported on said frame in spaced relation with said predetermined plane for holding said molding while clamped by said clamp means and during use of a saw in said saw guide means for cutting said molding; and further clamp means extendable and disposed to clamp pieces of said molding on said panel at said predetermined plane after the cutting of molding by said saw and during the fixing of said molding on said panel.

4. In a molding, cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said saw guide means comprising a pair of spaced saw guides disposed to be adjacent each of said four corners of a rectangular panel held on said frame by said first means, each saw guide of each pair having a saw guiding slot disposed to be directed substantially diagonally with respect to a corner of a rectangular panel held by said first means; said clamp means located with respect to said first means for holding elongated straight pieces of said molding in substantially parallel spaced relation to edges of said rectangular panel, said slots in each pair of spaced saw guides disposed to align with opposite mitered ends of a curved molding piece and to guide a saw to cut opposite ends of said straight pieces to align with respective mitered ends of said curved molding piece.

5. In a molding cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said saw guide means comprising a pair of spaced saw guides disposed to be adjacent each of said four corners of a rectangular panel held on said frame by said first means, each saw guide of each pair having a saw guiding slot disposed to be directed substantially diagonally with respect to a corner of a rectangular panel held by said first means; said clamp means located with respect to said first means for holding elongated straight pieces of said molding in substantially parallel spaced relation to edges of said rectangular panel, said slots in each pair of spaced saw guides disposed to align with opposite mitered ends of a curved molding piece and to guide a saw to cut opposite ends of said straight pieces to align with respective mitered ends of said curved molding piece; said frame comprising four bars disposed in a substantially rectangular assembly; a corner frame portion connected to each of said bars; a holding portion of each corner frame portion on which a bar, connected to an adjacent corner frame portion, is longitudinally movably mounted; means for fixing a respective bar in each holding portion; said first means comprising an L-shaped panel corner engaging and holding member; each panel corner engaging member secured to one of said corner frame portions, each of said pairs of saw guides supported on one of said corner frame portions, each of said slots of each saw guide disposed at an acute angle to one of said bars and pivotally adjustable about a vertical axis; and alignment means for fixing each saw guide in certain angular disposition with respect to said bars.

6. In a molding cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said saw guide means comprising a pair of spaced saw guides disposed to be adjacent each of said four corners of a rectangular panel held on said frame by said first means, each saw guide of each pair having a saw guiding slot disposed to be directed substantially diagonally with respect to a corner of a rectangular panel held by said first means; said clamp means located with respect to said first means for holding elongated straight pieces of said molding in substantially parallel spaced relation to edges of said rectangular panel, said slots in each pair of spaced saw guides disposed to align with opposite mitered ends of a curved molding piece and to guide a saw to cut opposite ends of said straight pieces to align with respective mitered ends of said curved molding piece; said frame comprising four bars disposed in a substantially rectangular assembly; a corner frame portion connected to each of said bars; a holding portion of each corner frame portion on which a bar, connected to an adjacent corner frame portion, is longitudinally movably mounted; means for fixing a respective bar in each holding portion; said first means comprising an L-shaped panel corner engaging and holding member; each panel corner engaging member secured to one of said corner frame portions, each of said pairs of saw guides supported on one of said corner frame portions, each of said slots of each saw guide disposed at an acute angle to one of said bars and pivotally adjustable about a vertical axis; and alignment means for fixing each saw guide in certain angular disposition with respect to said bars; said alignment means, including a slotted portion in each respective corner frame portion; a stem of a respective saw guide movably adjustable in said slotted portion; screw threaded means for tightening said stem and clamping it in fixed position relative to a respective corner frame portion; said corner frame portion having a series of openings spaced from said slotted portions; and a conforming pin fixed to said saw guides and engageable in any one of said openings.

7. In a molding cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said first means having a reference plane structure for holding a surface of a panel at a predetermined plane relative to said clamp means; ledge structures supported on said frame in spaced relation with said predetermined plane for holding said molding while clamped by said clamp means and during use of a saw in said saw guide means for cutting said molding; and further clamp means extendable and disposed to clamp pieces of said molding on said panel at said predetermined plane after the cutting of molding by said saw during the fixing of said molding on said panel; said saw guide means comprising a pair of spaced saw guides disposed to be adjacent each of said four corners of a rectangular panel held on said frame by said first means, each saw guide of each pair having a saw guiding slot disposed to be directed substantially diagonally with respect to a corner of a rectangular panel held by said first means; said clamp means located with respect to said first means for holding elongated straight pieces of said molding in substantially parallel spaced relation to edges of said rectangular panel, said slots in each pair of spaced saw guides disposed to align with opposite mitered ends of a curved molding piece and to guide a saw to cut opposite ends of said straight pieces to align with respective mitered ends of said curved molding piece; and means movably mounting said further clamp means for adjustment in a diagonal direction with respect to corners of said panel.

8. In a molding cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said first means having a reference plane structure for holding a surface of a panel at a predetermined plane relative to said clamp means; ledge structures supported on said frame in spaced relation with said predetermined plane for holding said molding while clamped by said clamp means and during use of a saw in said saw guide means for cutting said molding; and further clamp means extendable and disposed to clamp pieces of said molding on said panel at said predetermined plane after the cutting of molding by said saw and during the fixing of said molding on said panel; and corner molding fixtures on said frame disposed to hold curved portions of molding on a surface of said panel at said predetermined plane, said molding fixtures each having a pair of spaced ledge portions disposed substantially 90 degrees apart; said ledge portions adapted to be engaged by opposite mitered ends of a curved piece of molding.

9. In a molding cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said frame comprising four bars disposed in a substantially rectangular assembly; a corner frame portion connected to each of said bars; a holding portion of each corner frame portion on which a bar, connected to an adjacent corner frame portion; is longitudinally movably mounted; means for fixing a respective bar in each holding portion; said clamp means comprising a plurality of clamps longitudinally movably mounted on said bars; and means for fixing some of said clamps in juxtaposition on said bars.

10. In a molding cutting and fitting jig the combination of: a frame; first means on said frame adapted for holding a rectangular panel having four corners in juxtaposition relative to said frame; clamp means on said frame disposed to hold a plurality of molding pieces disposed longitudinally in directions to intersect each other at predetermined locations; saw guide means on said frame disposed to guide a saw for cutting said molding pieces to fit together at said predetermined locations, said first means having a reference plane structure for holding a surface of a panel at a predetermined plane relative to said clamp means; ledge structures supported on said frame in spaced relation with said predetermined plane for holding said molding while clamped by said clamp means and during use of a saw in said saw guide means for cutting said molding; and further clamp means extendable and disposed to clamp pieces of said molding on said panel at said predetermined plane after cutting of molding by said saw and during the fixing of said molding on said panel; said frame comprising four bars disposed in a substantially rectangular assembly; a corner frame portion connected to each of said bars; a holding portion of each corner frame portion on which a bar, connected to an adjacent corner frame portion, is longitudinally movably mounted; means for fixing a respective bar in each holding portion, said ledge structure carried by said clamp means; said ledge structure having an opening therethrough; said clamp means having a clamping screw extendable through said opening and into close proximity with said predetermined plane.

References Cited

UNITED STATES PATENTS

| 177,605 | 5/1876 | Wieting | 269—87.2 |
| 182,218 | 9/1876 | Myers | 269—181 X |
| 742,647 | 10/1903 | Herriman | 269—181 |

FOREIGN PATENTS 301,637  12/1928  Great Britain.

ROBERT C. RIORDON, *Primary Examiner.*

E. SUTTON, D. R. MELTON, *Assistant Examiners.*